US 11,496,991 B2

(12) United States Patent
Miller (10) Patent No.: US 11,496,991 B2
(45) Date of Patent: Nov. 8, 2022

(54) TEXT-WALKING VIOLATION CITATION SYSTEM AND METHOD

(71) Applicant: George Miller, Dallas, TX (US)

(72) Inventor: George Miller, Dallas, TX (US)

(*) Notice: Subject to any disclaimer, the term of this patent is extended or adjusted under 35 U.S.C. 154(b) by 85 days.

(21) Appl. No.: 16/936,790

(22) Filed: Jul. 23, 2020

(65) Prior Publication Data

US 2021/0029667 A1 Jan. 28, 2021

Related U.S. Application Data

(60) Provisional application No. 62/877,939, filed on Jul. 24, 2019.

(51) Int. Cl.
*H04W 64/00* (2009.01)
*G08B 25/00* (2006.01)
*H04W 4/029* (2018.01)

(52) U.S. Cl.
CPC ........ *H04W 64/006* (2013.01); *G08B 25/009* (2013.01); *H04W 4/029* (2018.02)

(58) Field of Classification Search
CPC ..... H04W 64/006; H04W 4/029; H04W 4/02; H04W 4/021; H04W 4/027; H04W 4/12; G08B 25/009; G08B 21/02; G01S 5/14; G01S 5/011; G01S 19/48; H04M 1/72436; H04M 1/72457; H04L 51/20
See application file for complete search history.

(56) References Cited

U.S. PATENT DOCUMENTS

2017/0344106 A1* 11/2017 Cohen .................... G06F 3/013
2019/0236387 A1* 8/2019 Firik ................. H04M 1/72457
2019/0260870 A1* 8/2019 Spivack ................. G06F 3/011

* cited by examiner

*Primary Examiner* — Joseph E Dean, Jr.
(74) *Attorney, Agent, or Firm* — John J. Patti; Patti Pershern, PLLC (57) ABSTRACT

A method is provided. A notice is received from a mobile device indicating that typing within a texting application has occurred substantially simultaneously as walking has been detected. The notice includes a timestamp of when the typing and the detection of walking occurred. A position of the mobile device is triangulated for the timestamp, and a determination is made as to whether the typing and the detection of walking occurred within a predetermined target area using at least a portion of data calculated from the step of triangulating.

17 Claims, 6 Drawing Sheets

TEXT-WALKING VIOLATION CITATION SYSTEM AND METHOD

CROSS-REFERENCE

This application claims priority to U.S. Provisional Patent Application Ser. No. 62/877,939, which was filed on Jul. 24, 2019 and which was titled "TEXT-WALKING VIOLATION CITATION SYSTEM AND METHOD." This application is incorporated by reference for all purposes.

TECHNICAL FIELD

The disclosure relates generally to a citation method and system and, more particularly, to a method and system for issuing citation for walking and texting in prohibited areas.

BACKGROUND

The growing prevalence of cellphones and the common occurrence of walking while texting creates dangerously distracting circumstances. Many jurisdictions have passed laws to penalize texting while walking, but the enforcement of such laws would require a law enforcement officer: (1) to visually identify the infraction; and (2) then to determine that the time is best spent in writing the citation. Once the citation is issued, it would then have to be prosecuted likely in a court. Even if the prosecution is successful, the fine would be minimal relative to other more substantial violations and would barely warrant enforcement. Needless to say, this process would be very inefficient and would not further the goal of encouraging safety and reducing accidents and mishaps of their citizens. In fact, it undermines the entire purpose of increasing the safety of all involved. Therefore, there is a need for a method and/or system for issuing citations for texting and walking.

SUMMARY

An embodiment of the present disclosure, accordingly, provides a method is provided. The method comprises: receiving a notice from a mobile device indicating that typing within a texting application has occurred substantially simultaneously as walking has been detected, wherein the notice includes a timestamp of when the typing and the detection of walking occurred; triangulating a position of the mobile device for the timestamp; and determining whether the typing and the detection of walking occurred within a predetermined target area using at least a portion of data calculated from the step of triangulating.

In accordance with an embodiment of the present disclosure, the position further comprises geographical location and elevation.

In accordance with an embodiment of the present disclosure, the method further comprises: issuing a stop notification to the mobile device if the typing and the detection of walking occurred within the predetermined target area; and receiving a stop response notification from the mobile device, wherein the stop response indicates whether additional typing within the texting application has occurred substantially simultaneously as walking has been detected.

In accordance with an embodiment of the present disclosure, the step of triangulating further comprises calculating the position based at least in part on communications between the mobile device and a plurality of base stations.

In accordance with an embodiment of the present disclosure, the method further comprises notifying a citation authority of a violation, wherein the notification includes the timestamp and the position.

In accordance with an embodiment of the present disclosure, the step of notifying the citation authority further comprises notifying the citation authority if the stop response indicates additional typing and detection of walking has occurred.

In accordance with an embodiment of the present disclosure, the method further comprises issuing a notification to the mobile device indicating that the citation authority has been notified.

In accordance with an embodiment of the present disclosure, the step of triangulating further comprises: determining whether the mobile device is monitoring its global positioning system (GPS) position; calculating the position based at least in part on communications between the mobile device and a plurality of base stations if the mobile device is not monitoring its GPS position; and calculating the position based at least in part on communications between the mobile device and a plurality of base stations and the mobile device's GPS data if the mobile device is monitoring its GPS position.

In accordance with an embodiment of the present disclosure, a system is provided. The system comprises: a plurality of base stations positioned relative to one another to form a coverage area, wherein the plurality of base stations are configured to communicate with a mobile device; and a server that is in communication with the plurality of base stations and configure to have a server application execute thereon, wherein the server application is configured to: receive a notice from a mobile device indicating that typing within a texting application has occurred substantially simultaneously as walking has been detected, wherein the notice includes a timestamp of when the typing and the detection of walking occurred; triangulate a position of the mobile device for the timestamp, wherein the position further comprises geographical location and elevation; determine whether the typing and the detection of walking occurred within a predetermined target area using at least a portion of data calculated from the step of triangulating; issue a stop notification to the mobile device if the typing and the detection of walking occurred within the predetermined target area; and receive a stop response notification from the mobile device, wherein the stop response indicates whether additional typing within the texting application has occurred substantially simultaneously as walking has been detected.

In accordance with an embodiment of the present disclosure, the server application, as configured to triangulate the position, is further configured to: determine whether the mobile device is monitoring its GPS position; calculate the position based at least in part on communications between the mobile device and a plurality of base stations if the mobile device is not monitoring its GPS position; and calculate the position based at least in part on communications between the mobile device and a plurality of base stations and the mobile device's GPS data if the mobile device is monitoring its GPS position.

In accordance with an embodiment of the present disclosure, the server application is further configured to notify a citation authority of a violation, wherein the notification includes the timestamp and the position.

In accordance with an embodiment of the present disclosure, the server application, as configured to notify the citation authority, is further configured to notify the citation authority if the stop response indicates additional typing and detection of walking has occurred.

In accordance with an embodiment of the present disclosure, the server application issuing a notification to the mobile device indicating that the citation authority has been notified.

In accordance with an embodiment of the present disclosure, the server further comprises a plurality of servers.

In accordance with an embodiment of the present disclosure, a mobile device is provided. The mobile device comprises: a user interface; a sensor that is configured to sense motion; communication circuitry that is configured to communicate with a plurality of base stations and GPS system; a processor with memory that is configured to communicate with the user interface, the sensor, and the communication circuitry; a texting application that is configured to execute on the processor and memory, wherein the texting application is configured to indicate to the operating system whether a user is typing a message through the user interface; a GPS framework that is configured to execute on the processor and memory, wherein the GPS framework is configured to communicate with the communication circuitry to obtain GPS data; an accelerometer framework that is configured to execute on the processor and memory, wherein the accelerometer framework is configured to communicate with the sensor, and wherein the accelerometer framework is configured to calculate whether the user is walking based at least in part on motion sensed by the sensor; a citation application that is configured to execute on the processor and memory, wherein the citation application is configured to: receive a first indication from the accelerometer framework that the user is walking; receive a first indication from the texting application that the user is typing; determine whether the first texting and walking indications occurred substantially simultaneously; recording a first timestamp of when the first texting and walking indications occurred; issue a notification over the communication circuitry that the first texting and walking indications occurred substantially simultaneously, wherein the notification includes the first timestamp; receive a stop notification if the first texting and walking indications, which occurred substantially simultaneously, were in a predetermined target area; display the stop notification to the user over the user interface; receive a second indication from the accelerometer framework that the user is walking; receive a second indication from the texting application that the user is typing; determine whether the second texting and walking indications occurred substantially simultaneously; and issue a stop response notification over the communication that indicates whether the second texting and walking indications occurred substantially simultaneously.

In accordance with an embodiment of the present disclosure, the mobile device further comprises a smartphone or tablet.

In accordance with an embodiment of the present disclosure, the citation application is further configured to display a notification received over the communications circuitry that indicates that the citation authority has been notified.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 1:
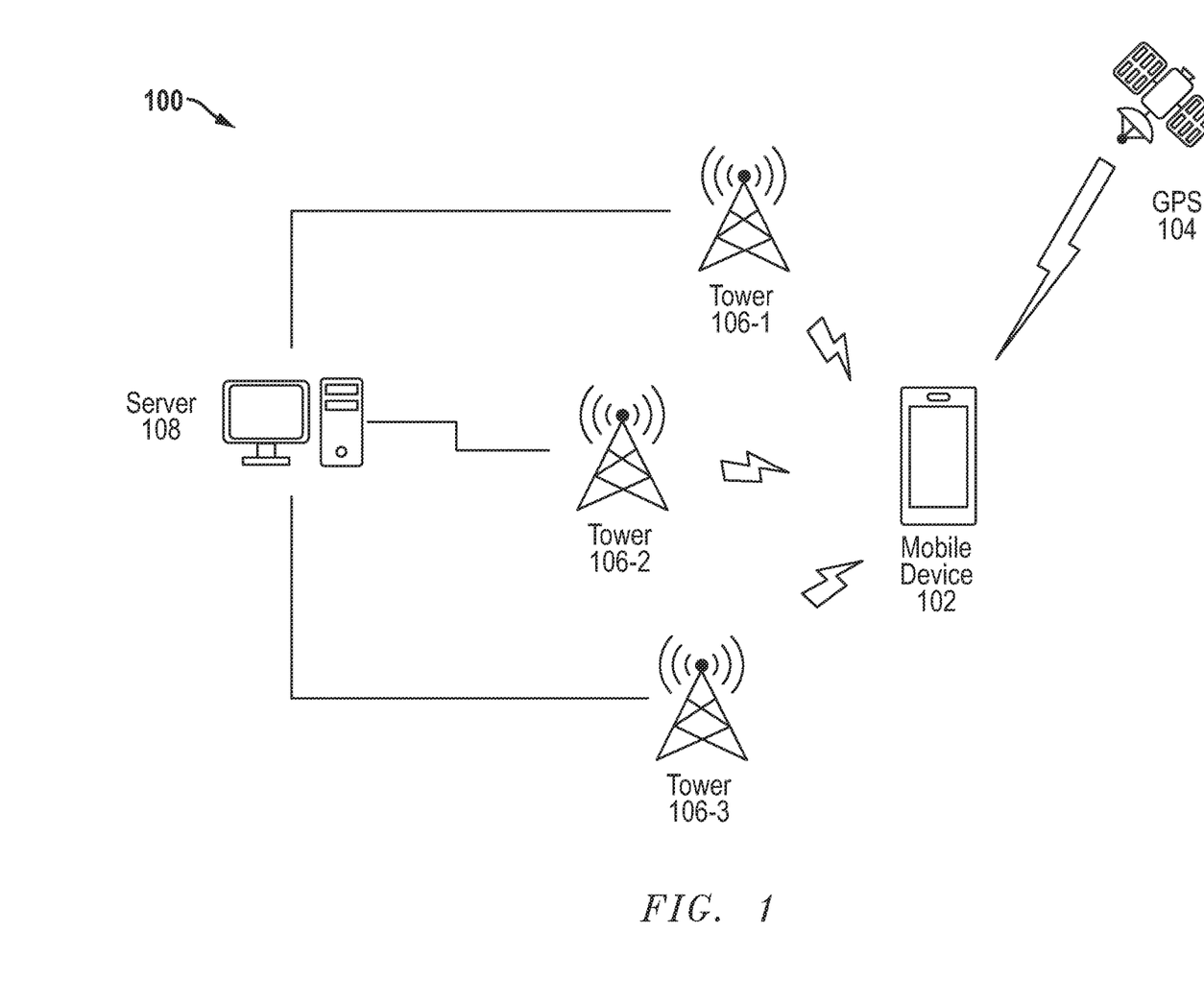
FIGS. 1 and 2 are a system in accordance with a preferred embodiment of the present disclosure.
Figure 2:
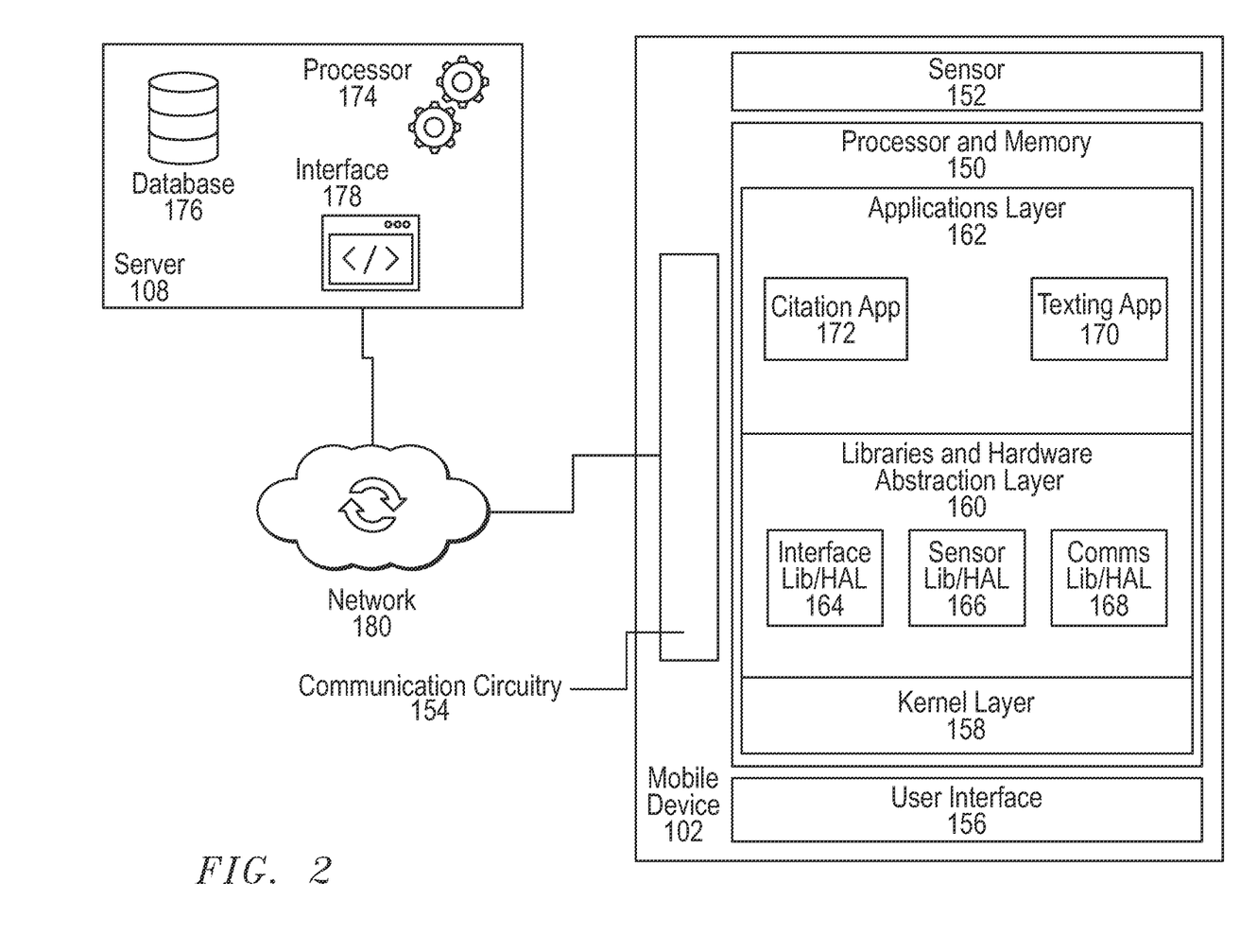

Referring to FIGS. 1 and 2, a depiction of an example of a system in accordance with a preferred embodiment of the present disclosure can be seen. Conventionally, the cell towers or base stations 106-1 to 106-3 (for which there may be more for fewer towers than depicted) form a network 180 along with a conventional switched packet network (like the Internet). Alternatively or additionally, the base stations 106-1 to 106-3 may also include WiFi hotspots or other wireless access points which allow network access through a switched packet network. This network 180 allows communications between a mobile device 102 and server 108 (which each can have applications installed thereon related to citation for text-walking). For the sake of simplicity, a single mobile device 102 and server 108 are shown, but there can be and usually are more of each. Additionally, the mobile device 102 can receive positioning data from the global positions system (GPS) 104.

A carrier (like VERIZON®) would typically install applications on mobile devices (e.g., 102) that operate with their network. These applications can serve a number of purposes ranging from regulatory matters to basic network operation. In some areas (typically, densely populated urban areas like New York City), municipalities or states impose restrictions as to when a user may walk and text at the same time, and the ordinances or laws imposed may force to carrier to install a citation application 172 on mobile devices 102 that allow the carrier to report violations of text-walking ordinances or laws.

Turning first to the mobile device 102 (which can be seen in FIGS. 2 and 3), it can operate essentially as a sensor node. As shown, the mobile device 102 (which can be any type of mobile device capable of sending or receiving text messages like smartphones or tablets) is generally comprised of a user interface 156, processor and memory 150, communications circuitry 154, and sensor 152. Then, a software stack can operate on the processor and memory 150. This software stack can be generally comprised of a kernel layer 158 (e.g., LINUX® kernel) that performs the basic operations and coordination for the operating system (OS), a library and hardware abstraction layer (HAL) 160 that interfaces hardware components within the mobile device 102, and an applications layer 162.

Figure 3:
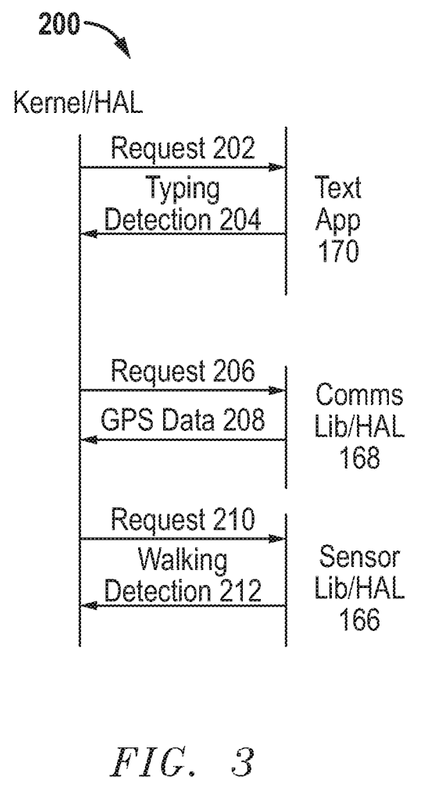
FIG. 3 depicts an example of communications within a mobile device used in the system of FIGS. 1 and 2.

For this example system, the sensor 152 may be comprised of one or more sensors that can be used for motion sensing (e.g., gyroscope, accelerometer, attention monitor, facial recognition monitors and other directional sensors to establish a potential "texting plane event" where the cell user would be orienting the cell phone in a relatively horizontal to semi angle relative to the users likely field of vision as well as typing in a keystroke fashion on a QWERTY or other keyboard configuration). Information from the sensor 152 can be communicated through the libraries and HAL 160 (which itself includes a sensor lib/HAL 166). This sensor lib/HAL 166 can determine whether there is a "walking event," (e.g., 212) and such an event can be reported to the citation application 172 (in applications layer 162). Typically, for this reporting of walking event to occur, a request 210 is made (which itself would usually only occur when the text application 170 is active). Alternatively, the citation application 172 may operate as a data relay for a cloud-based processing server which could perform at least a portion of the functionality.

Similarly, the texting application 170 is able to communicate through the libraries and HAL layer 160. For example, indicia for texting data (e.g., letters for messages) can be detected through the interface lib/HAL 164 when a user types on the interface, and complete text messages can be sent to the communications circuitry 154 through the comms lib/HAL 168. As such, the texting application 170 is configured to determine when (e.g., with a timestamp) a user is typing a text message. Such a typing event (e.g., 204) can be reported to the citation application 172 as well. This typing detection 204 can typically be done once a request 202 has been made. The request 202 usually occurs when the user (via the user interface 156) request the texting application 170.

Figure 4:
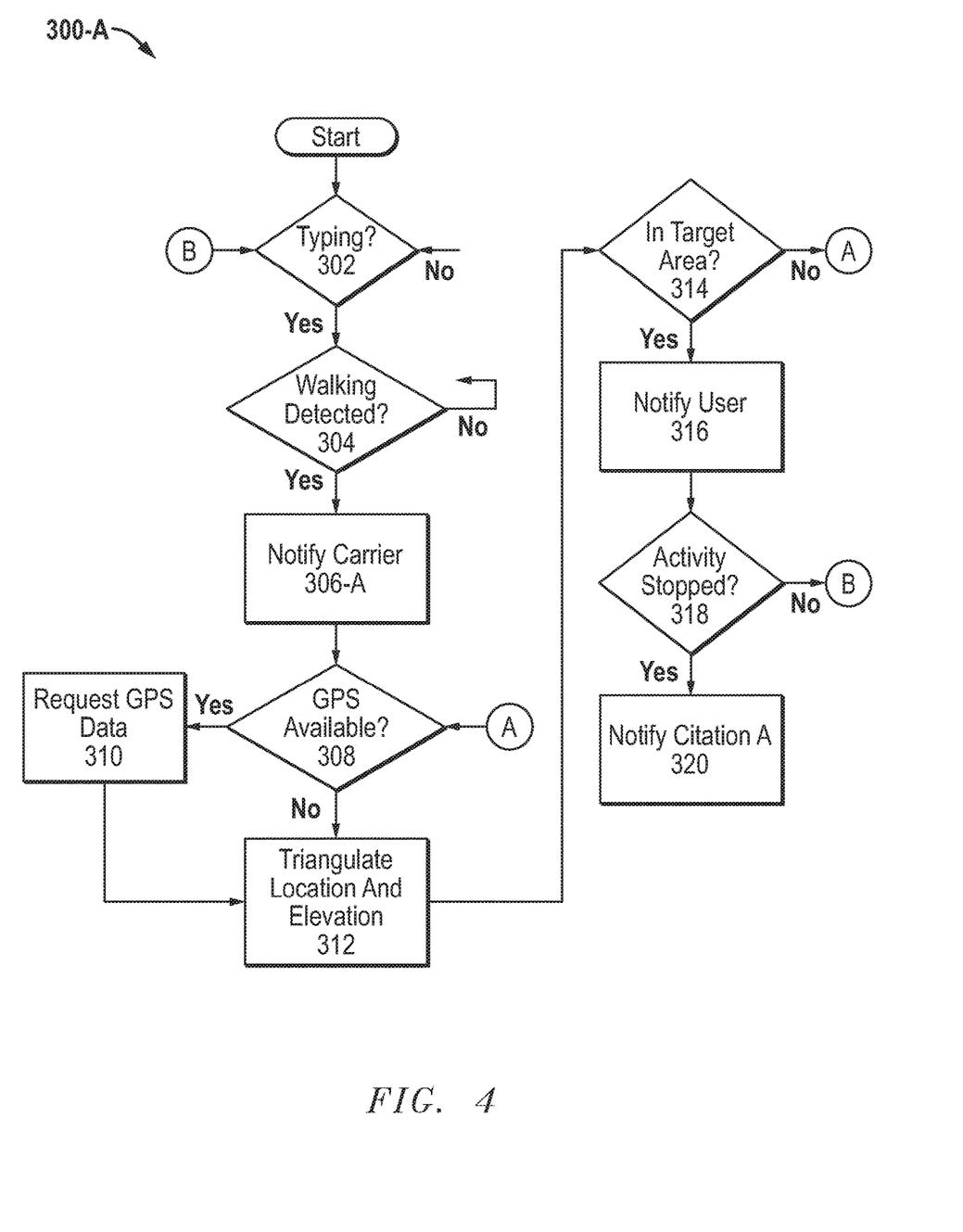
FIGS. 4, 6, and 7 are flow charts that depict examples of communications between a mobile device and a server in the system of FIGS. 1 and 2.
Figure 5:
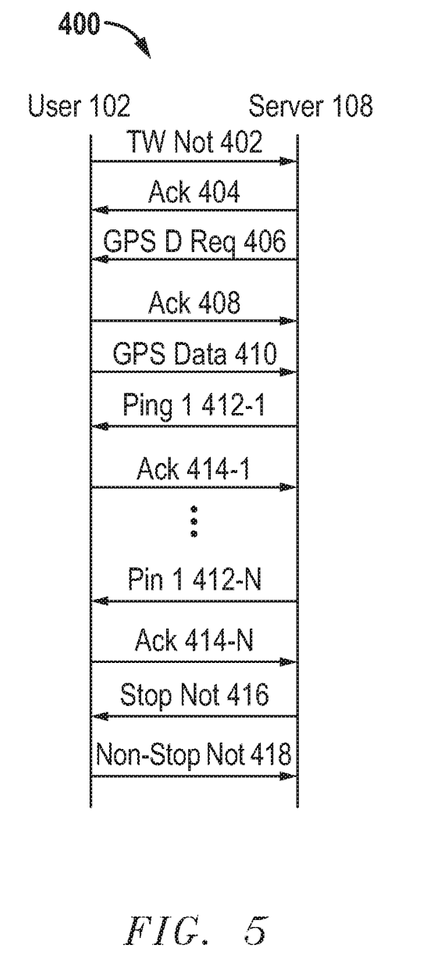
FIG. 5 depicts an example of communications between a mobile device and a server in the system of FIGS. 1 and 2.
Figure 6:
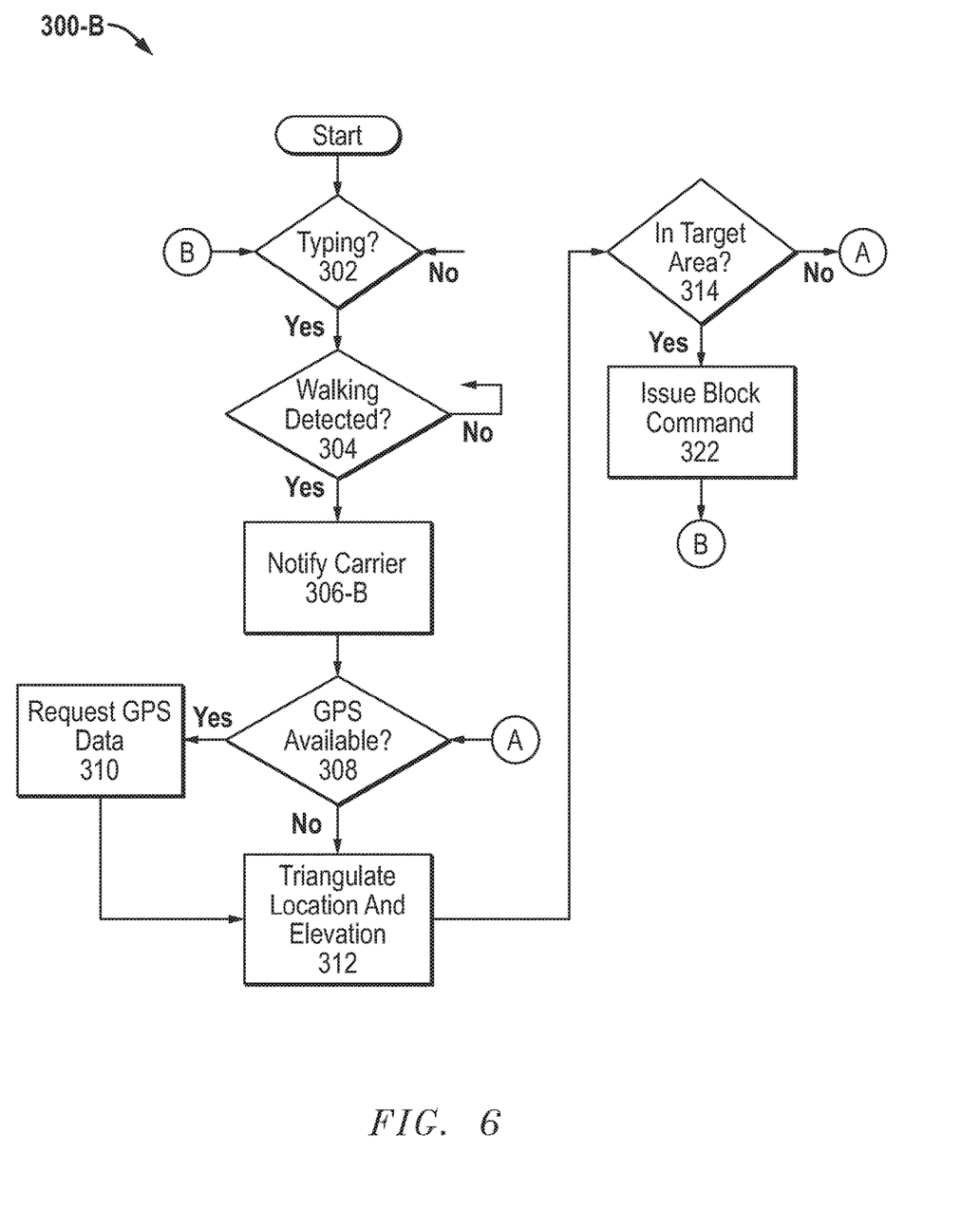
Figure 7:
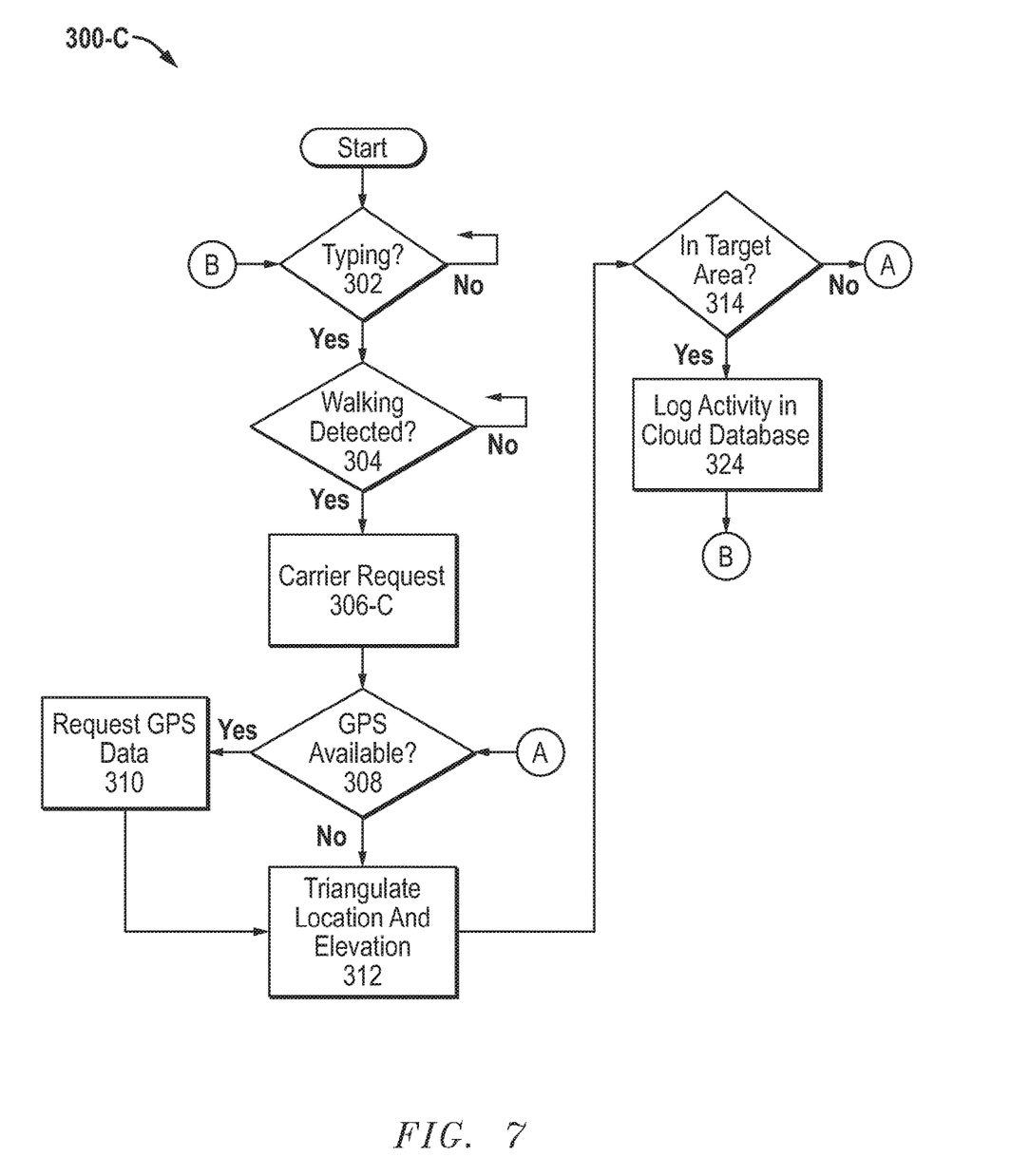

Now, turning to the interaction between the server 108 and mobile device 102, they can be seen in FIGS. 2 and 4-7. The server 108 can be generally comprised of processor 174, interface 178 (which can allow interaction with network 180 and/or a user), and a database 176. During normal operation (as shown in FIGS. 4, 6, and 7), the mobile device 102 is able to detect when the typing events (e.g., step 302) and walking event (e.g., step 304). When both events occur substantially simultaneously or at approximately the same time, the citation application 172 records a timestamp for the typing and walking events and issues a notification to the server 108 (e.g., 402 or 306) via the comms lib/HAL 168, communication circuitry 154, and network 180 (to which an acknowledge 404 is received from server 108).

Once the server 108 (which is usually a carrier's server) has been notified of a text-walking event of mobile device 102, it can endeavor to determine the location for the event, which can be done with at least two different data sets (e.g., cellular and GPS). As such, the server 108 determines whether GPS data (e.g., GPS triangulation data) is available (e.g., step 308), and can be delivered when available a data request is made (e.g., 310 or 406), acknowledged (e.g., 408), and delivered (e.g., 410). GPS data, however, may not be available, so cellular triangulation can be used. It may also be used in addition to GPS data. There are variety of well-known manners to determine position (e.g., geographical location and elevation) based on cellular data, and the example illustrated uses pings (e.g., 412-1 to 412-N) and acknowledges (e.g., 414-1 to 414-N). Doing this allows for the establishment of the signal strength between multiple towers for which the position can be easily calculated (e.g., 312). Similarly, already-used received signal strength indications (RSSIs) may be used as well. With the establishment of position (e.g., geographical location and elevation), a comparison can be made to known target areas. Typically, the target areas are predefined by ordinances or laws and stored in database 176. The processor 174 usually can make the comparison.

When a text-walking event occurs within a target area (e.g., on the sidewalk of a particular street within a city), one of three different operations (or some combination thereof) can occur, which are depicted in FIGS. 4, 6, and 7. Additional operations may also be possible. As shown in example of FIG. 4, the server 108 can notify the user of the violation (e.g., by pop-up window or text message) in step 316, and the server 108 can wait to see whether the behavior ceases. Such a stop request may include an emergency response request that would require the user to respond or acknowledge receipt of the stop notification. Such a determination of whether the activity has stopped (e.g., in step 318) can be carried out by the citation application 172 which measures whether additional typing and walking occur following the notification to the user (e.g., step 316). If the behavior continues, then the citation authority can be notified in step 320 (which can include transmission to another server); multiple warning (e.g., repeats of step 316) may also be used prior to notification of the citation authority (e.g., step 320). At this point the user can be notified of the alert to the notification authority. Additionally, the citation or warning can be delivered either as a pop-up message, a text receipt, an email, or delivered directly for billing by the carrier. As the policy goal of the system to enhance public safety that are many ways to structure the billing of the fines to as to encourage compliance, including a delayed billing that can be waived with a period of compliance or a cumulative violation alert that leads to a greater offense and perhaps a requirement to appear in court. Alternatively, as shown in FIG. 6, the server 108 can issue a block command (e.g., step 322) that prevents the text message application from functioning. As another alternative shown in FIG. 7, activity can be logged in a cloud database (e.g., database 176 or another database in an alternate server) for later use (e.g., by a citation authority or court) in step 324.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Accordingly, it is appropriate that the appended claims be construed broadly.

The invention claimed is:

1. A method comprising:
receiving a notice from a mobile device indicating that typing within a texting application has occurred substantially simultaneously as walking has been detected, wherein the notice includes a timestamp of when the typing and the detection of walking occurred; triangulating a position of the mobile device for the timestamp; and determining whether the typing and the detection of walking occurred within a predetermined target area using at least a portion of data calculated from the step of triangulating; and issuing a stop notification to the mobile device if the typing and the detection of walking occurred within the predetermined target area; issuing a notification to a citation authority if additional typing occurring substantially simultaneously with additional walking is detected following the step of issuing the stop notification.

2. The method of claim 1, wherein the position further comprises geographical location and elevation.

3. The method of claim 2, wherein the method the detection of the additional typing occurring substantially simultaneously with the additional walking further comprises: receiving a stop response notification from the mobile device, wherein the stop response indicates whether additional typing within the texting application has occurred substantially simultaneously as walking has been detected.

4. The method of claim 3, wherein the step of triangulating further comprises calculating the position based at least in part on communications between the mobile device and a plurality of base stations.

5. The method of claim 3, wherein the step of triangulating further comprises:
determining whether the mobile device is monitoring its global positioning system (GPS) position;
calculating the position based at least in part on communications between the mobile device and a plurality of base stations if the mobile device is not monitoring its GPS position; and
calculating the position based at least in part on communications between the mobile device and a plurality of base stations and the mobile device's GPS data if the mobile device is monitoring its GPS position.

6. The method of claim 5, wherein the notification to the citation authority includes the timestamp and the position.

7. The method of claim 4, wherein the method further comprises notifying a citation authority of a violation, wherein the notification to the citation authority includes the timestamp and the position.

8. The method of claim 7, wherein the method further comprises issuing a notification to the mobile device indicating that the citation authority has been notified.

9. The method of claim 6, wherein the method further comprises issuing a notification to the mobile device indicating that the citation authority has been notified.

10. A system comprising:
a plurality of base stations positioned relative to one another to form a coverage area, wherein the plurality of base stations are configured to communicate with a mobile device; and a server that is in communication with the plurality of base stations and configure to have a server application execute thereon, wherein the server application is configured to: receive a notice from a mobile device indicating that typing within a texting application has occurred substantially simultaneously as walking has been detected, wherein the notice includes a timestamp of when the typing and the detection of walking occurred; triangulate a position of the mobile device for the timestamp, wherein the position further comprises geographical location and elevation; determine whether the typing and the detection of walking occurred within a predetermined target area using at least a portion of data calculated from the step of triangulating; issue a stop notification to the mobile device if the typing and the detection of walking occurred within the predetermined target area; receive a stop response notification from the mobile device, wherein the stop response indicates whether additional typing within the texting application has occurred substantially simultaneously as walking has been detected; and notify the citation authority, is further configured to notify the citation authority if the stop response indicates additional typing and detection of walking has occurred.

11. The system of claim 10, wherein the server application, as configured to triangulate the position, is further configured to:
determine whether the mobile device is monitoring its GPS position;
calculate the position based at least in part on communications between the mobile device and a plurality of base stations if the mobile device is not monitoring its GPS position; and
calculate the position based at least in part on communications between the mobile device and a plurality of base stations and the mobile device's GPS data if the mobile device is monitoring its GPS position.

12. The system of claim 11, wherein the server application is further configured to notify a citation authority of a violation, wherein the notification includes the timestamp and the position.

13. The system of claim 12, wherein the server application issuing a notification to the mobile device indicating that the citation authority has been notified.

14. The system of claim 13, wherein the server further comprises a plurality of servers.

15. A mobile device comprising:
a user interface; a sensor that is configured to sense motion; communication circuitry that is configured to communicate with a plurality of base stations and GPS system; a processor with memory that is configured to communicate with the user interface, the sensor, and the communication circuitry; a texting application that is configured to execute on the processor and memory, wherein the texting application is configured to indicate to the operating system whether a user is typing a message through the user interface; a GPS framework that is configured to execute on the processor and memory, wherein the GPS framework is configured to communicate with the communication circuitry to obtain GPS data; an accelerometer framework that is configured to execute on the processor and memory, wherein the accelerometer framework is configured to communicate with the sensor, and wherein the accelerometer framework is configured to calculate whether the user is walking based at least in part on motion sensed by the sensor; a citation application that is configured to execute on the processor and memory, wherein the citation application is configured to: receive a first indication from the accelerometer framework that the user is walking; receive a first indication from the texting application that the user is typing; determine whether the first texting and walking indications occurred substantially simultaneously; recording a first timestamp of when the first texting and walking indications occurred; issue a notification over the communication circuitry that the first texting and walking indications occurred substantially simultaneously, wherein the notification includes the first timestamp; receive a stop notification if the first texting and walking indications, which occurred substantially simultaneously, were in a predetermined target area; display the stop notification to the user over the user interface; receive a second indication from the accelerometer framework that the user is walking; receive a second indication from the texting application that the user is typing; determine whether the second texting and walking indications occurred substantially simultaneously; issue a stop response notification over the communication that indicates whether the second texting and walking indications occurred substantially simultaneously; and issuing a notification to a citation authority if in response to the second texting and walking indications that occurred substantially simultaneously.

16. The mobile device of claim 15, wherein the mobile device further comprises a smartphone or tablet.

17. The mobile device of claim 16, wherein the citation application is further configured to display a notification received over the communications circuitry that indicates that the citation authority has been notified.

* * * * *